(12) United States Patent
Bernstein et al.

(10) Patent No.: US 12,225,043 B2
(45) Date of Patent: Feb. 11, 2025

(54) SYSTEMS AND METHODS FOR SECURITY PROCESS ANALYSIS

(71) Applicant: Gutsy.IO, LTD, Tel Aviv (IL)

(72) Inventors: Ben Bernstein, New York, NY (US); John Morello, Baton Rouge, LA (US); Dima Stopel, Herzliya (IL)

(73) Assignee: Gutsy.IO, LTD, Tel Aviv (IL)

(*) Notice: Subject to any disclaimer, the term of this patent is extended or adjusted under 35 U.S.C. 154(b) by 0 days.

(21) Appl. No.: 18/667,464

(22) Filed: May 17, 2024

(65) Prior Publication Data
US 2024/0388596 A1    Nov. 21, 2024

Related U.S. Application Data

(60) Provisional application No. 63/504,737, filed on May 27, 2023, provisional application No. 63/502,830, filed on May 17, 2023.

(51) Int. Cl.
*H04L 9/40* (2022.01)

(52) U.S. Cl.
CPC .................. *H04L 63/1433* (2013.01)

(58) Field of Classification Search
CPC .................................................. H04L 63/1433
See application file for complete search history.

(56) References Cited

U.S. PATENT DOCUMENTS

| 7,447,666 | B2 | 11/2008 | Wang | |
|---|---|---|---|---|
| 7,788,719 | B1 * | 8/2010 | Hernacki | H04L 63/1408 726/25 |
| 8,291,495 | B1 * | 10/2012 | Burns | H04L 63/168 713/153 |
| 8,595,840 | B1 * | 11/2013 | Malibiran | G06F 21/554 726/25 |

(Continued)

FOREIGN PATENT DOCUMENTS

| CA | 2943271 C | * 9/2023 | .......... G06F 21/554 |
|---|---|---|---|
| CN | 108040493 B | * 12/2021 | .......... G06F 21/552 |

(Continued)

OTHER PUBLICATIONS

International Search Report for PCT/IB2024/054822 dated Aug. 29, 2024. Searching Authority, Israel Patent Office, Jerusalem, Israel.
(Continued)

*Primary Examiner* — Sarah Su
(74) *Attorney, Agent, or Firm* — M&B IP Analysts, LLC

(57) ABSTRACT

A method and system for cyber-security processes mining are provided. The method comprises correlating events received from a plurality of data sources into a plurality of flows, wherein a flow of the plurality of flows is a sequence of events having a same identifier, and wherein at least one of the plurality of data sources is a cyber-security system; correlating the plurality of flows into a plurality of variants, wherein a variant out of the plurality of variants includes one or more flows having the same repeatable pattern; associ- (Continued)

ating the plurality of variants with at least one cyber-security process based on a predefined template defining the cyber-security process; and causing a display of the least one cyber-security process and its plurality of variants.

20 Claims, 8 Drawing Sheets

(56) References Cited

U.S. PATENT DOCUMENTS

| | | | | |
|---|---|---|---|---|
| 8,682,812 | B1* | 3/2014 | Ranjan | H04L 43/028 |
| | | | | 706/12 |
| 9,137,139 | B2* | 9/2015 | Roosta | H04L 65/102 |
| 2005/0132206 | A1* | 6/2005 | Palliyil | G06F 21/566 |
| | | | | 713/188 |
| 2008/0005782 | A1* | 1/2008 | Aziz | G06F 21/554 |
| | | | | 718/1 |
| 2010/0198636 | A1* | 8/2010 | Choudhary | G06F 21/552 |
| | | | | 726/1 |
| 2011/0093955 | A1* | 4/2011 | Chen | G06F 21/577 |
| | | | | 726/25 |
| 2012/0030761 | A1* | 2/2012 | Baba | H04L 63/1416 |
| | | | | 726/23 |
| 2015/0135263 | A1 | 5/2015 | Singla et al. | |
| 2016/0241574 | A1* | 8/2016 | Kumar | H04L 63/12 |
| 2016/0241577 | A1* | 8/2016 | Johnson | G06F 16/24554 |
| 2017/0063884 | A1 | 3/2017 | Seigel | |
| 2018/0176139 | A1* | 6/2018 | Mortensen | H04L 43/20 |
| 2020/0213343 | A1* | 7/2020 | Bharrat | G06N 3/045 |
| 2021/0029148 | A1* | 1/2021 | Wee | H04L 67/34 |
| 2021/0136076 | A1* | 5/2021 | Barhudarian | H04L 63/06 |
| 2022/0311794 | A1* | 9/2022 | Maya | G06F 11/0766 |
| 2023/0095870 | A1 | 3/2023 | Du | |
| 2023/0111864 | A1* | 4/2023 | Thomas | G06F 21/53 |
| | | | | 726/1 |
| 2023/0199024 | A1* | 6/2023 | Dods | H04L 63/1416 |
| | | | | 726/23 |
| 2024/0098099 | A1* | 3/2024 | Dutta | H04L 63/1416 |

FOREIGN PATENT DOCUMENTS

| | | | |
|---|---|---|---|
| CN | 117391214 A | * | 1/2024 |
| EP | 3528460 A1 | | 8/2019 |

OTHER PUBLICATIONS

Written Opinion of the Searching Authority for PCT/IB2024/054822 dated Aug. 29, 2024. Searching Authority, Israel Patent Office, Jerusalem, Israel.

\* cited by examiner

SYSTEMS AND METHODS FOR SECURITY PROCESS ANALYSIS

CROSS-REFERENCE TO RELATED APPLICATIONS

This application claims the benefit of U.S. Provisional Application No. 63/502,830, filed on May 17, 2023, and of U.S. Provisional Application No. 63/504,737, filed on May 27, 2023, the contents of which are hereby incorporated by reference.

TECHNICAL FIELD

The present disclosure generally relates to computerized systems and methods for discovering, analyzing, and improving software security processes using process mining techniques.

BACKGROUND

Process mining is a technique in the field of data science that helps to analyze operational processes based on event logs. The goal of process mining is to turn event data into insights and actions. Process mining techniques use event data to show what people, machines, and organizations are doing. Process mining provides insights that can be used to identify the execution path taken by operational processes and address their performance and compliance problems.

Data sources for gathering data for conventional process mining are limited to IT systems, enterprise resource planning (ERP) systems, and customer relationship management (CRM) systems. Data gathered from such systems include event logs, where each event log typically includes information about what happened when it happened, and who or what executed the activity.

One of the primary functions of process mining is to discover, visualize, and analyze the actual processes by reconstructing them from logs. This helps in understanding how processes are executed in reality, often revealing the path taken through a process, including sequences, parallel executions, and variations.

Currently, process mining is only being used in applications related to manufacturing, healthcare, finance, and logistics. However, there are no existing solutions that suggest process mining can be implemented in the field of cybersecurity. Providing a process mining solution in cybersecurity is a complex problem that has yet to be addressed. The complexity arises in part due to the number and different types of security systems and tools, the nature of reported events, as well as the structure and content of such reports.

For example, cyber-security encompasses a wide array of systems and tools designed to protect networks, devices, programs, and data from attack, damage, or unauthorized access. Examples of such systems and tools include firewalls, intrusion detection systems (IDS) and intrusion prevention systems (IPS), data loss prevention (DLP) systems, identity and access management (IAM) systems, security information and event management (SIEM) systems, network security tools, vulnerability scanners, web application firewalls (WAF), and the like. Further, such systems and tools are typically provided by different vendors.

A typical organization implements multiple cyber-security systems and tools to protect the organization. Organizations will implement different processes to report and fix incidents. The incidents being reported typically through events are thousands per day in a typical organization.

Furthermore, different systems report different events. That is, any security process requires coordination across multiple non-security and security systems and teams. No system or team works in isolation. Security processes involve both security and non-security systems, such as ticket management systems and chat applications. Designing and executing security processes consistently is crucial for successful security. Any misstep in the process, such as assigning tickets to the wrong team or failing to upgrade the application at runtime to the correct version, can result in an insecure application or waste time rectifying the mistake. It is difficult to identify these errors without correlating event data across all steps in the process. Unfortunately, there are no existing solutions to mine or discover security processes in organizations, which leaves organizations vulnerable.

It would be, therefore, advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or causes the system to perform the actions. One or more computer programs can be configured to perform particular operations or actions by virtue of including instructions that, when executed by data processing apparatus, cause the apparatus to perform the actions.

In one general aspect, the method may include correlating events received from a plurality of data sources into a plurality of flows, where a flow of the plurality of flows is a sequence of events having a same identifier, and where at least one of the plurality of data sources is a cyber-security system. The method may also include correlating the plurality of flows into a plurality of variants, where a variant out of the plurality of variants includes one or more flows having the same repeatable pattern. Method may furthermore include associating the plurality of variants with at least one cyber-security process based on a predefined template defining the cyber-security process; and causing a display of the least one cyber-security process and its plurality of variants. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: correlate events received from a plurality of data sources into a plurality of flows, where a flow of the plurality of flows is a sequence of events having a same identifier, and where at least one of the plurality of data sources is a cyber-security system; correlate the plurality of flows into a plurality of variants, where a variant out of the plurality of variants includes one or more flows having the same repeatable pattern; associate the plurality of variants with at least one cyber-security process based on a predefined template defining the cyber-security process; and cause a display of the least one cyber-security process and its plurality of variants. Other embodiments of this aspect include corresponding computer systems, apparatus, and computer programs recorded on one or more computer storage devices, each configured to perform the actions of the methods.

In one general aspect, a system may include one or more processors configured to: correlate events received from a plurality of data sources into a plurality of flows, where a flow of the plurality of flows is a sequence of events having a same identifier, and where at least one of the plurality of data sources is a cyber-security system; correlate the plurality of flows into a plurality of variants, where a variant out of the plurality of variants includes one or more flows having the same repeatable pattern; associate the plurality of variants with at least one cyber-security process based on a predefined template defining the cyber-security process; and cause a display of the least one cyber-security process and its plurality of variants. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
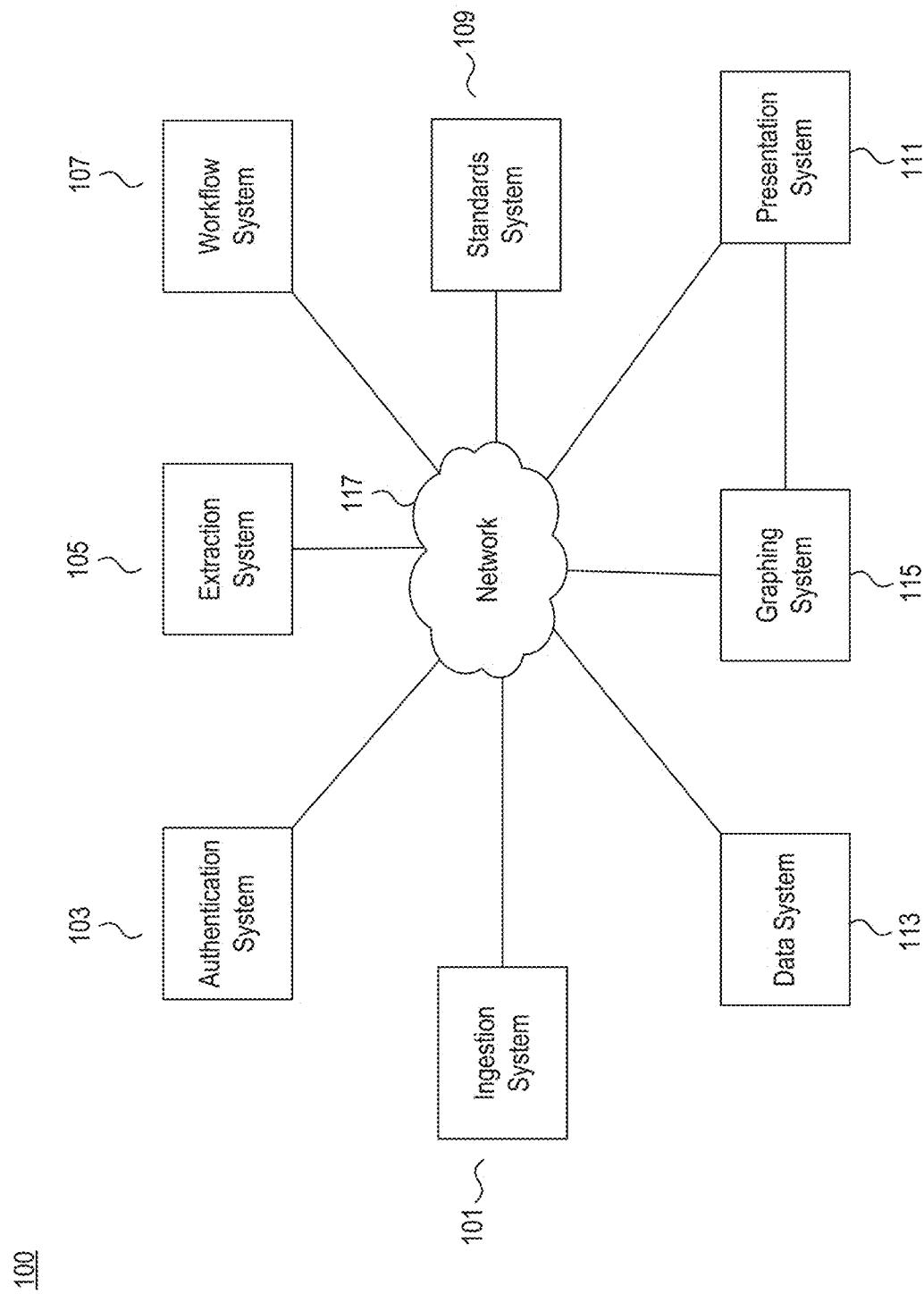
FIG. 1 is a network diagram of a system, consistent with the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Embodiments of the present disclosure are directed to systems, methods, and computer-readable media configured for mining, discovering, and analyzing cyber-security processes (hereinafter a "security-process" or "security-processes"). A security-process includes a sequence of steps related to a cyber-security issue. A cyber-security issue related to vulnerabilities, incidences, compliance, governance, protocols, and the like. For example, a security-process may relate to an incident response and may include anomaly detection and triage, forensic data collection and investigation, IoC data ingestion distribution, phishing response, and the like. As another example, a security-process may relate to vulnerability management and may include vulnerability detection and remediation, zero-day response, risk assessment, and the like. As yet another example, a security-process may relate to identity management and may include user management, a vendor onboarding and offboarding, a privileged account management, an multi-factor authentication (MFA) enablement and recovery, an application programming interface (API) key management, and a fraudulent account detection.

According to disclosed embodiments, variants of security-process are detected and analyzed. A variant may represent an optimal execution of a security-process, a risky security-process, an incomplete security-process, and the like. A variant is a correction of flows, where a flow is a sequence of events analyzed according to the disclosed embodiments.

One purpose of embodiments of the disclosure is to use process mining techniques to discover, analyze, and improve security processes within organizations, such as medium to large enterprises.

The disclosed embodiments offer several technical benefits. In one embodiment, the security-process mining and analysis allows for a data-driven comprehension of the organization's operations. This means that the process mining system collects data from various systems and automatically connects activities across operations to create and display visual information about how the organization operates.

Identifying hidden risks is one of the key technical advantages of the disclosed embodiments. Security incidents are not one-time events but a continuous set of processes that happen every day. Even with advanced detection and response security systems, and a detailed incident response plan, organizations may still face unnecessary risk if responders forget to isolate systems during investigations. While security tools can identify specific technical vulnerabilities and risks, responding to and mitigating them is a larger process that can be made much easier with the disclosed security-process mining method.

The security-process mining method has several technical benefits, such as enabling continuous improvement. By obtaining a comprehensive understanding of processes, it becomes easier to identify bottlenecks and root causes and address security issues more efficiently. Additionally, the security-process mining method allows for monitoring and enforcing compliance, which is a widely recognized security objective.

As discussed in greater detail below, the disclosed security-process mining includes processing a vast number of events generated by multiple different systems, provided by different vendors. For example, a typical enterprise may include tens of different systems, where such a system generates hundreds of events every day. Further, the format of such events is different from one system to another. Analyzing such events for mining security processes that are not known as a priori is a complex task that requires significant computing power and algorithms.

Therefore, it should be understood that the operations described herein cannot be performed using the human mind or by performing the operation using paper and pencil. Moreover, a human operator applies subjective criteria to select/simulate/predict, leading to results that are not consistent between different human operators, and often not consistent between the same human performing the same task repeatedly, and in particular at the speeds required to provide an operable solution. The number of possible permutations for analyzed events, security-processes, and parameter values selection, by far exceed any practical use of the human mind.

FIG. 1 is a depiction of an exemplary network diagram 100, consistent with the disclosed embodiments for security-processes mining and analysis. In some embodiments, network 100 includes ingestion system 101, authentication system 103, extraction system 105, workflow system 107, standards system 109, presentation system 111, data system 113, graphing system 115, and network infrastructure 117. Each of the systems is depicted as being present in a single instance in FIG. 1. However, in some embodiments, any of the systems (including network infrastructure 117) may be modified, duplicated, combined, or omitted.

Ingestion system 101, in some embodiments, may include elements that may generate data regarding a network (e.g., network infrastructure 117), virtual machines, databases, cloud systems, security, processes, or other data. Ingestion system 101 may generate this data by detecting operations performed by itself or by other devices, systems, users, agents, or the like. Ingestion system 101 may provide data to another device in network 100. In some embodiments, ingestion system 101 may include a security tool, such as but not limited to, an intrusion detection system (IDS) and an intrusion prevention system (IPS), a data loss prevention (DLP) system, a network security tool, a vulnerability scanner, a web application firewall (WAF), a cloud vulnerability scanner, and the like. For example, the data provided by ingestion system 101 may include, a detection of a virtual machine image with a vulnerability embedded in it, by scanning the image against known exploits. In other embodiment, ingestion system 101 may include a security information and event management (SIEM) system.

Authentication system 103, in some embodiments, may include elements that enable authentication by a user/system/agent to access data or functionality stored on one or more other devices or systems, including Lightweight Directory Access Protocol (LDAP) services, IAM services, single sign-on services, federated identity services, or the like, and may generate data relating to actions taken on such devices or systems. Authentication system 103 may generate this data by detecting operations performed by itself or by other devices, systems, users, agents, or the like. Authentication system 103 may provide that data to another device in system 100. The data provided by authentication system 103 may include, for example, a record of one or more unsuccessful logins to another system in FIG. 1.

Extraction system 105, in some embodiments, may include systems that extract data from other systems and generate data for sending to humans, devices, systems, agents, or the like. Extraction system 105 may provide the data to another device in network 100. In some case embodiments, extraction system 105 includes a ticking system, such as Jira® which allows to manage and track the progress of issues, tasks, or projects within a team or organization. In another embodiment, extraction system 105 may include a development pipeline platform, e.g., GitHub. Such a platform allows developers to create, store, manage, and share their code.

The data provided by extraction system 105 may include, for example, a ticket indicating that a vulnerable image was detected by ingestion system 101 or a chat message on a messaging service (e.g., Slack) indicating that a login failure was detected by authentication system 103.

Workflow system 107, in some embodiments, may include systems that implement systems for code automation, workflows, microservices, or the like. The data provided by workflow system 107 may include, for example, events such as the hiring of an employee, the termination of an employee, steps in an on-boarding or off-boarding process for employees, steps in an on-boarding or off-boarding process for vendors, or the like.

Standards system 109, in some embodiments, may include elements that store data relating to standards for computing and/or provide such data to other devices, systems, agents, or the like. Examples of standards that are stored by standards system 109 may include standards from the Payment Card Industry Data Security Standard (PCI/DSS), the Center for Internet Security (CIS), the U.S. Department of Defense, the International Organization for Standardization (ISO), the European Union Agency for Cyber-security (ENISA), or the like. Standards system 109 may provide the data to another device in system 100. The data provided by standards system 109 may include, for example, data on best practices for fixing security issues.

Presentation system 111, in some embodiments, may include systems that represent data stored by or processed by graphing system 115 in a visual format (e.g., in text, graphically, or a combination of the two). For example, the diagrams in FIGS. 2 and 3 (described below) may, in some embodiments, be generated by presentation system 111, based on information stored by or processed by graphing system 115.

Data system 113, in some embodiments, may include elements that store other data. Examples of data stored by data system 113 may include documentation or the like. Data system 113 may provide data to another device in network 100.

Graphing system 115, in some embodiments, may include elements that receive information provided by one or more of ingestion system 101, authentication system 103, extraction system 105, workflow system 107, standards system 109, presentation system 111, data system 113, or network infrastructure 117.

Each ingestion system 101, authentication system 103, extraction system 105, workflow system 107, standards system 109, presentation system 111, data system 113, and network infrastructure 117 may provide data to graphing system 115. The data may be in a variety of forms, including system logs (e.g., syslog files). The data may be sent or received using APIs (e.g., an API of graphing system 115 and/or an API of one of ingestion system 101, authentication system 103, extraction system 105, workflow system 107, standards system 109, presentation system 111, data system 113, or network infrastructure 117), and may include structured data, unstructured data, or a combination of the two.

The graphing system 115 is a security-process mining system configured to carry out the disclosed embodiment. The output graphing system 115 can be further processed by presentation system 111 to visually present the outcome of the mining process. Further, the outputs of graphing system 115 can be stored in data system 113. In some configurations, graphing system 115 and presentation system 111 can be integrated into the same system. The graphing system 115 can be realized in software, hardware, or a combination thereof. An example block diagram of graphing system 115 is discussed below with reference to FIG. 8.

The data received by graphing system 115 may represent events performed by, monitored by, detected by, performed at, monitored at, or detected at, one or more of ingestion system 101, authentication system 103, extraction system 105, workflow system 107, standards system 109, presentation system 111, data system 113, or network infrastructure 117. The data may include information such as a timestamp indicating when the event took place, identifying information (e.g., IP addresses, usernames, block volume names), error messages, or the like.

Graphing system 115 may, in some embodiments, implement a system for deploying a collector program for use with one or more ingestion system 101, authentication system 103, extraction system 105, workflow system 107, standards system 109, presentation system 111, data system 113, or network infrastructure 117. The collector program may, in some embodiments, collect the data while resident and operating on one of the aforementioned systems or network infrastructure 117, and send it to graphing system 115.

Graphing system 115, in some embodiments, may utilize regular expressions to interpret data received from one or more of ingestion system 101, authentication system 103, extraction system 105, workflow system 107, standards system 109, presentation system 111, data system 113, or network infrastructure 117. Graphing system 115 may, using those regular expressions, interpret the data to determine "events" that are present.

Graphing system 115 may perform functions, such as those described below with respect to at least FIG. 4, that collect events from received data and correlate the events with previous "flows" of events to determine and display outliers. For example, graphing system 115 may correlate events based on text that is incorporated into multiple events. For example, if a ticket number is referenced across multiple events, graphing system 115 may determine that the multiple events are related and correlate them into a single flow.

Graphing system 115 may also correlate events using timestamps of the events. For example, graphing system 115 may determine that events are related based on them occurring in a particular order. Graphing system 115 may also correlate events based on known or unknown algorithms, including an alpha algorithm ("α-algorithm"), a heuristics miner algorithm, an inductive miner algorithm, or the like.

Graphing system 115 may, after correlating events with one another, determine a baseline of events called a "flow" or a "case." A flow, in some embodiments, may be a series (or a stream) of events that are connected in some manner and represent a particular process. In an embodiment, all events in a flow are correlated by at least the same case ID. In some embodiments, a most common flow for a particular process may be decided.

As an example, the following events are reported by three different systems. A vulnerability scanner (e.g., ingestion system) reports a vulnerability event on an image. The event includes the following information:
Identifier: CVE-2017-0144 and resource_type: image_id
Event message: " . . . discovered CVE-2017-0144"
Timestamp: 10/1/2022, 12:01:20

A ticketing system (e.g., extraction system 105) indicates that the vulnerability alert has an associated developer ticket. The ticket (event) includes the following information:
Identifier: CVE-2017-0144 and resource_type:image_id
Event message: "ticket created"
Timestamp: 10/1/2022, 12:01:3610/1/2022, 12:01:36
Other info: Assignee name A development platform (e.g., extraction system 105) event shows that the developer pushed a commit command to resolve the CVE-ID. The event includes the following information:
Identifier: CVE-2017-0144 and resource_type:image_id
Event message: "pushed CVE-2017-0144 branch and merged commit"
Timestamp: 10/1/2022, 20:00:0010/1/2022, 20:00:00

All of the above events have the same identifier. By correlating these events from three different systems (tools), graphing system 115 automatically constructs a flow describing a security-process of what happens when a security incident (vulnerability) is discovered. That is, the process is remediating a vulnerability.

Graphing system 115 first maps each occurrence of the security-process by correlating identifiers for all of the events ingested from the data sources. Every flow, which is to say end-to-end security-process execution, is mapped as a sequence of events. Flows may follow repeatable patterns, and each such pattern is identifiable as a unique security-process variant. Every security-process variant is recognizable by the type of events it includes and their sequence. Each discovered security-process is assigned a process name.

For example, graphing system 115 may identify variants of a determine that there are two variants for repairing a vulnerable virtual machine image-a first with events A, B, C, and D, and a second with events A, B, X, Y, and D.

As another example, for the remediating vulnerability process shown above, the variant may not include following the steps of the process (detect a vulnerability, open a ticket, and push a fix). For example, one variant may include events for detecting a vulnerability, assigning the vulnerability to an unmonitored queue, and no commit merge. Another variant may include events detecting a vulnerability and failure to create a ticket.

It should be noted that the sequence of the events is crucial to the outcome. A flow may define an ideal outcome of a process, which may be referred to as the target or desired variant. Ideally, all flows of a process should follow the pattern of the target variant. But in reality, some flows often deviate from the target, with methods often changing between executions, and leading to many process variants. Not surprisingly, some variants lead to undesirable outcomes. For example, a vulnerability would remain unresolved.

In an embodiment, discovered security-processes and their variants can be displayed as graphs. Presentation system 111 can generate such visual representation in response to the mining performed by graphing system 115.

In some embodiments, flows and/or variants of a security-process may be compared against a baseline to determine outliers. Determining a baseline, in some example embodiments, may include determining the number of times that each flow has occurred (e.g., during a set period of time or during a lifetime of network 100) and noting which one occurs more often. For example, if the first flow (A→B→C→D) occurred 12,000 times and the second flow (A→B→X→Y→D) occurred 15,000 times, graphing system 115 may determine that the second flow is the "baseline"

flow, and compare other flows (e.g., the first flow) to the second flow. In some embodiments, graphing system 115 may compare flows against other flows using known or unknown algorithms, including conformance checking. It should be noted that the same notation may work to establish a baseline for a variant.

Network infrastructure 117, in some embodiments, may be implemented as one or more public or private networks, including the Internet, an Intranet, a MAN (Metropolitan-Area Network), a WAN (Wide-Area Network), a leased line, a wireless network compliant with the IEEE 802.11 standards or the like. It should be noted that network infrastructure 117 may be implemented in myriad ways, and the particular implementation depends on the application for which it is used. Network infrastructure 117 may include, in some embodiments, one or more collector devices or systems for collecting data, such as traffic information, security information, or the like.

The particular configuration depicted in FIG. 1 is an example only. For example, while FIG. 1 depicts authentication system 103 connected to data system 113 through network infrastructure 117, not all embodiments require this particular configuration. For example, authentication system 103 may be directly connected to data system 113. As another example, while each of the systems is represented as separate in FIG. 1, in some embodiments, one or more of the systems may be implemented using the same hardware, software, virtual machine, or the like. Furthermore, while each of the systems is represented as a single entity in FIG. 1, in some embodiments, each such system may include one or more entities. For example, ingestions system 101 may include different security detection tools (scanners) provided by different vendors.

Figure 2:
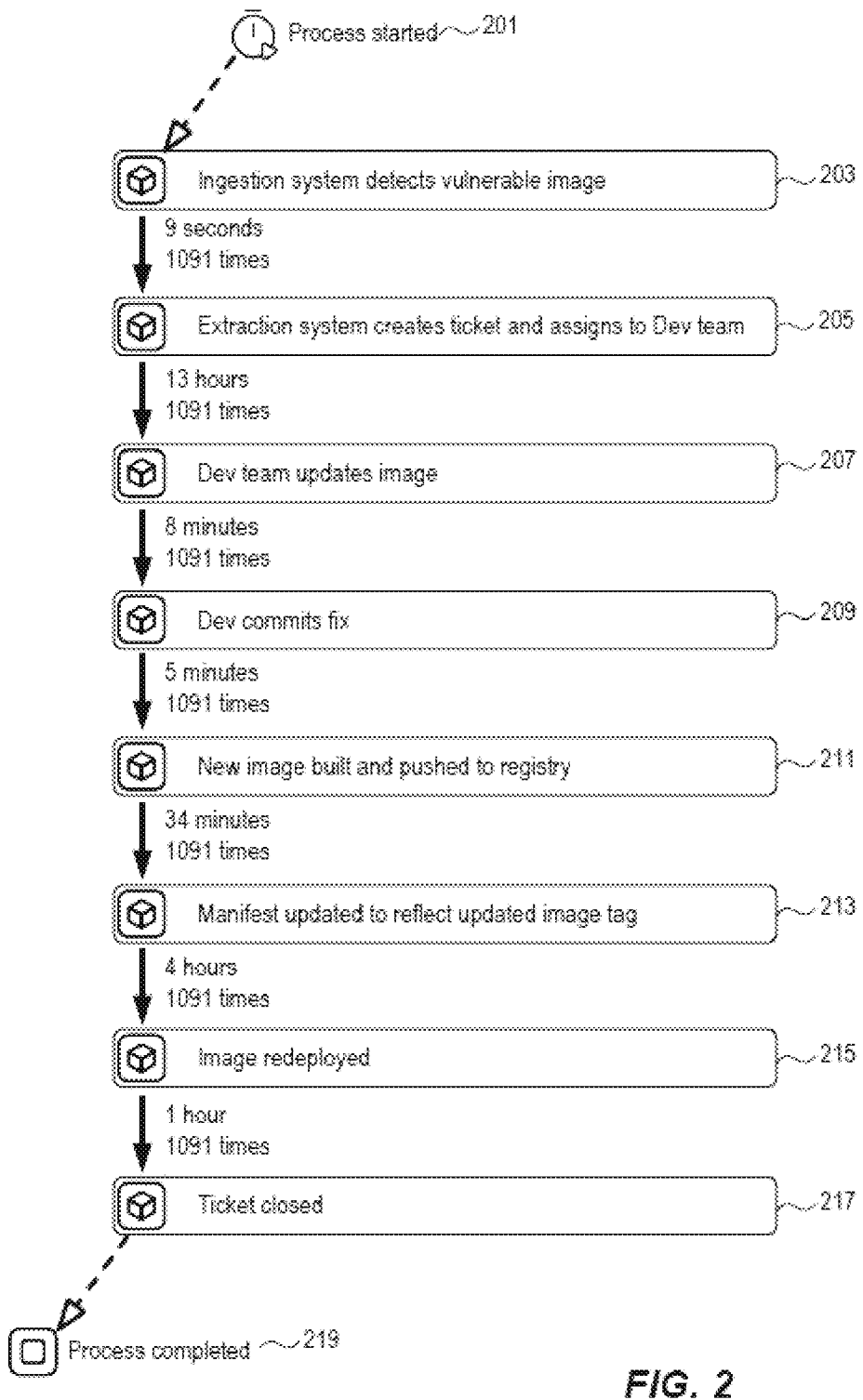
FIG. 2 is an exemplary diagram of a security process for fixing security issues discovered according to the disclosed embodiments.

FIG. 2 depicts an exemplary security-process 200 for fixing security issues discovered using the disclosed embodiments.

One purpose of embodiments of the disclosure is to use process mining techniques to discover, analyze, and improve security processes within medium to large organizations.

Consider the following example: Mills Ltd is a large software enterprise with ~5,000 employees. The enterprise develops a new storage solution for space stations. The enterprise uses a cloud security system to discover security vulnerabilities within their product, a ticketing system (e.g., Jira®) to manage their work, and a cloud-based storage system to store and manage their code. The enterprise has a process 200 of dealing with vulnerabilities, as depicted in FIG. 2, which starts at step 201. Events processed to discover or mine process 200 are received from ingestion system (such as system 101, FIG. 1), extraction system (e.g., extraction system 105, FIG. 1), and workflow system (e.g., workflow system 107). In this example discussed herein, the ingestion system is a cloud security system, the extraction system is a ticketing system, and the workflow system is a GitHub. Each event received during the process is listed and described below.

Whenever a vulnerability is discovered by the cloud security system (step 203), a member of the security team opens a ticket (e.g., using a ticketing system) and assigns the ticket to the development team (step 205). A member of the development team works to fix the vulnerability (step 207). Once fixed, the code is checked into the cloud-based storage system (step 209). After the code is checked in, a new software image is built, without the vulnerability, to be deployed later on (step 211). A developer then updates a manifest with the updated version (step 213), and the updated version is deployed using the new manifest (step 215). Once done, the ticket is closed (step 217), and the process ends (step 219).

Security-process 200 indicates the average amount of time for each step. Such information is gathered from, for example, system logs, databases of logs, APIs, or other locations/systems storing data memorializing events. In some embodiments, the average amount of time for each event may be based on the average of all times or may be modified (e.g., to remove outliers, to present only three standard deviations from the average or the like).

Security-process 200 represents an exemplary process for fixing security issues. Some steps in security-process 200 are automatic, and some are manual; some are made by people, and some are made by machines.

Figure 3:
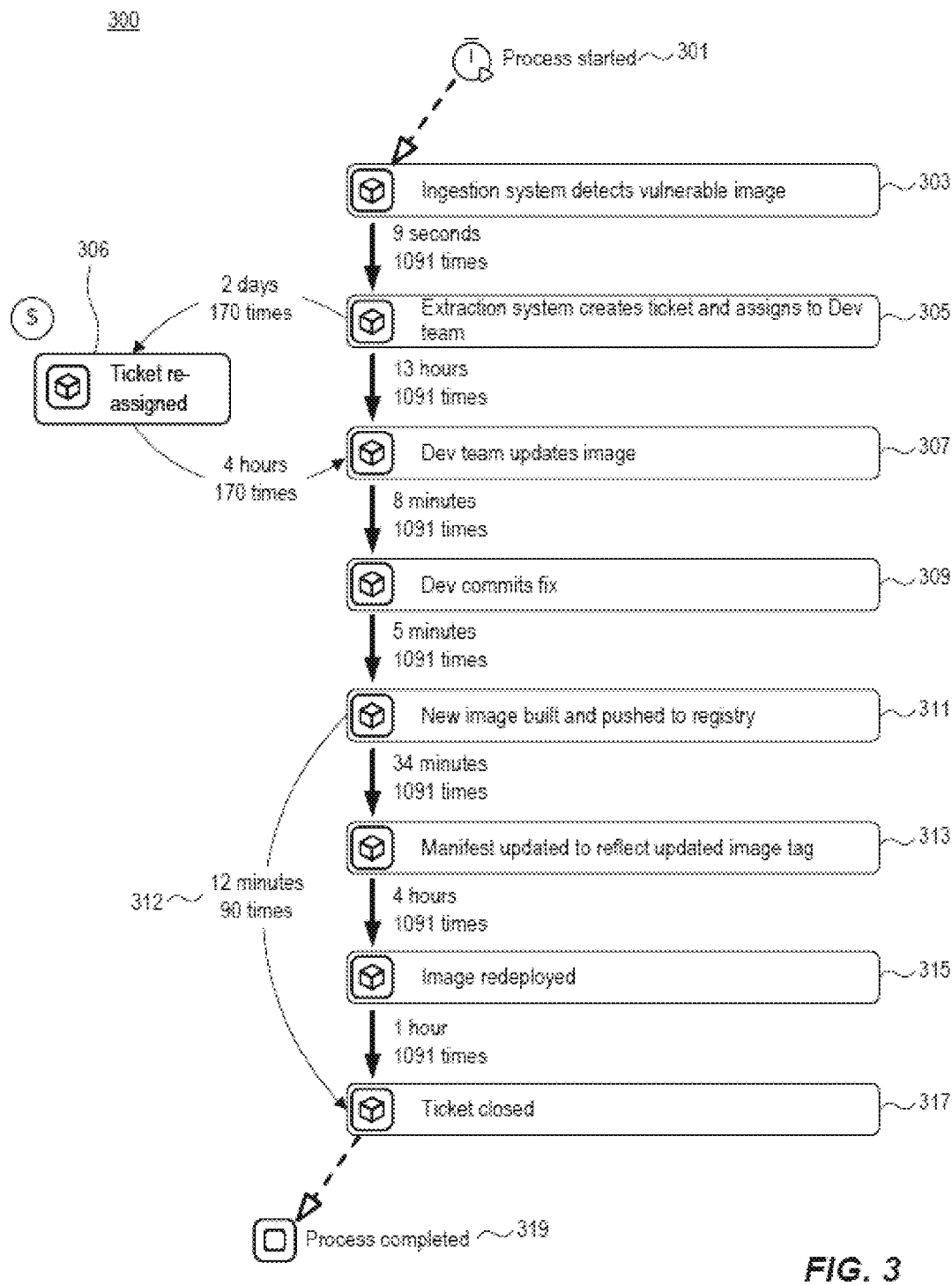
FIG. 3 is another exemplary diagram of a security process for fixing security issues with variants discovered according to the disclosed embodiments.

FIG. 3 is a depiction of an exemplary security-process 300 for fixing security issues discovered using the disclosed embodiments. One purpose of embodiments of the disclosure is to use process mining techniques to discover, analyze, and improve security processes within medium to large organizations.

FIG. 3 represents problems or outliers that can occur with security-process 200. The process starts at step 301. Whenever a vulnerability is discovered by the cloud security system (step 303), a member of the security team opens a ticket (e.g., using a ticketing system) and assigns the ticket to the development team (step 305). A member of the development team works to fix the vulnerability (step 307). Once fixed, the code is checked into the cloud-based storage system (step 309). Here, in process 300, step 306 depicts that a ticket was reassigned 170 times. While not necessarily a security issue, this does indicate that in 170 instances, resources and time were potentially wasted in reassigning the ticket, instead of having the ticket worked on more quickly. As another example, step 312 depicts that a new image was built and pushed to a registry (step 311), but the manifest was not updated to reflect that updated image (step 313), nor was the updated image deployed (step 315). Instead, an older image was potentially re-used. While potentially faster than the same operations in security-process 200, this could yield a security issue because of the potential use of an outdated and insecure image (step 317).

Figure 4:
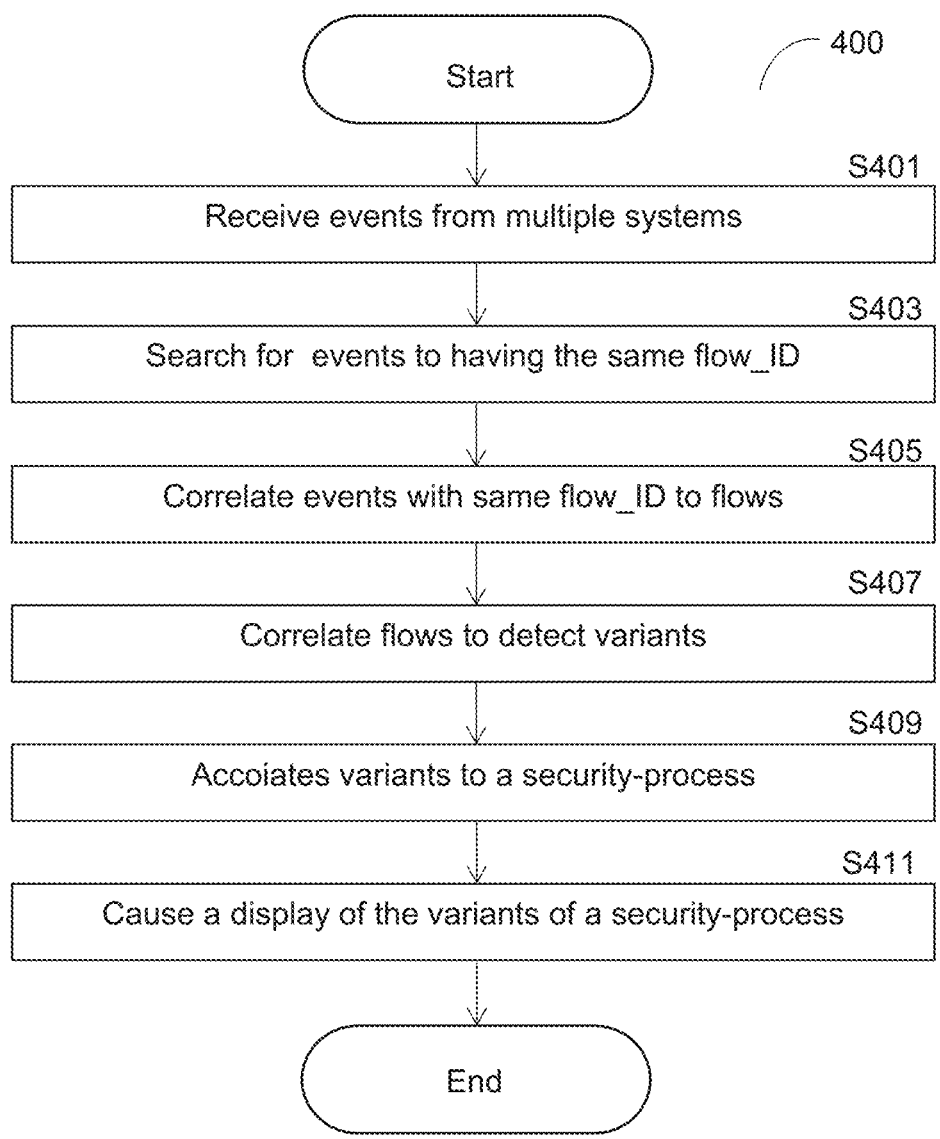
FIG. 4 is a flowchart of a method for storing events relating to processes consistent with the disclosed embodiments.

FIG. 4 is an example flowchart 400 of a method of security-processes mining and analysis according to the disclosed embodiments. The method allows for discovering, analyzing, and improving security-processes within organizations. As noted above, for example, inconsistencies in a defined security-process can often lead to unexpected delays and, in some cases, complete failure to detect and mitigate security vulnerabilities in real-time. Organizations are at risk due to the lack of visibility into their security-processes. The method discussed herein can be implemented by graphing system 115. At S401, events are received from multiple data sources. Events can be received on demand, pushed to, or pulled by graphing system 115. The events can be obtained or gathered through an API. The data sources may include the systems discussed above. Generally, the data sources include security systems (or tools) and non-security systems (or tools).

Collecting events from security systems is required to discover security processes. Events received from such a system may include any incident detected, for example, by vulnerability scanners, firewalls, code scanners, endpoint detection and response (EDR) sensors, phishing attempts, and the like. Discovery of the security-processes further requires collecting events from non-security systems. For example, ticketing systems are used to track vulnerability remediation efforts, human resource management systems trigger the process of creating or removing users, and messaging platforms are used to receive alerts about security incidents. Mining data from such non-security systems is critical to understanding security processes comprehensively.

Generally, each event includes a number of records, such as an identifier, timestamp, event message, and the like. Each vendor may define its own format, structure, or notation for event records. A simple example, an identifier may be designated as: "ID" or "Event_ID", each would hold the same contents of the identifier's value. Some events may specifically designate the identifier record, while some events would include that as part of a message string. The event message describes the activity that took place. The timestamp identifies the time associated with the event (e.g., created, closed, etc.). Example events generated by different systems are provided above. It should be noted that event refers to other formats such as logs, files, documents, signals, and the like.

According to one embodiment, events may be gathered during a predetermined time window and then processed. In another embodiment, when a predetermined number of events are gathered, the processing of such event events begins.

In an embodiment, to allow an efficient process mining analysis, S401 includes transforming data collected from various systems and tools and uploading the transformed data into correlated and normalized information. S401 may further include consolidating the collected data, removing noise, aggregating, and normalizing the data as required to discover security-processes, as discussed herein.

At S403, a flow_ID is identified, and a search is performed across the received events to collect events having a flow_ID. A flow_ID may include an event identifier. For example, a CVE number is the flow_ID in the events mentioned above. Thus, all events that have the same CVE_number will be collected as part of the flow. In an embodiment, the search is performed using a regular expression. The flow_ID may be the identifier used to correlate the events. In some example embodiments, a primary flow_ID and secondary flow_ID are assigned. For example, a primary flow_ID may be a combination of a CVE number and a host number, while the primary flow_ID may be only the host number. The flow_IDs are required to collate events as they are received to identify additional flows that can be mapped to variants of a main security-process.

At S405, events having the same flow_ID are corrected into a flow. A flow is a sequence of events having the same flow_ID. The correlation also organized the events in the correct order of operation. That is, a vulnerability detection event will occur before committing a fix to the detected vulnerability. Such correlation is performed using the timestamp and the event message. Events may be correlated based on known or unknown algorithms, including an alpha algorithm ("α-algorithm"), a heuristics miner algorithm, an inductive miner algorithm, or the like. In an embodiment, data associated with identified flows is saved in a database, such as data system 113, FIG. 1.

At S407, any flows identified are correlated with stored (previously identified) flows to detect variants of a security-process. A variant includes one or more flows having the same repeatable pattern but not the same flow_ID. A repeatable pattern means the same number of events of the same type and in the same order. That is, in an embodiment, the correlation is performed based on the number of events in a flow and their respective type.

Figure 5:
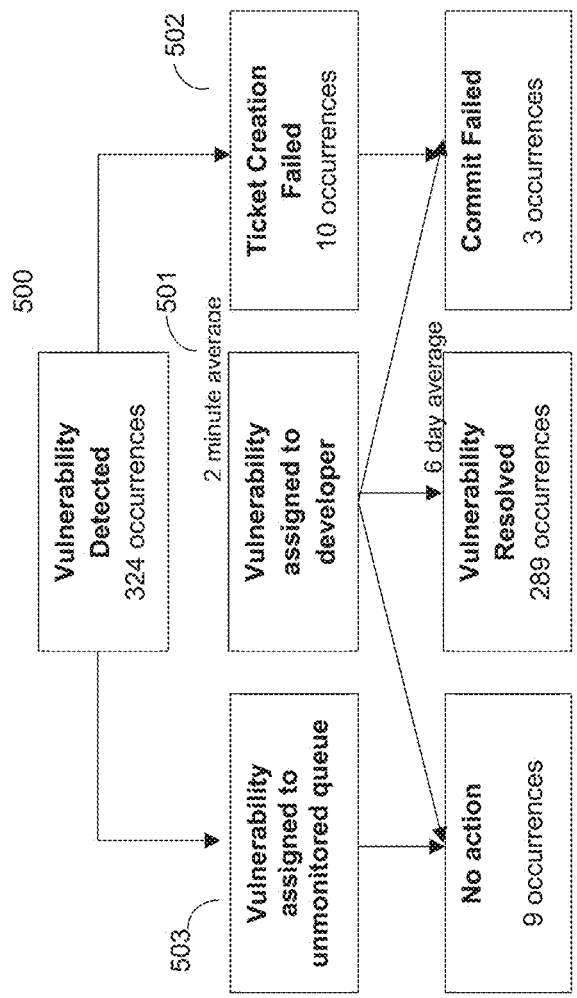
FIG. 5 is a diagram illustrating variants of a security-process for remediating vulnerabilities.

Example variants are demonstrated in FIG. 5. The variants are based on flows 500 generated from events received from a vulnerability scanner, a ticketing system, and a development pipeline system. Variant 501 shows the steps: vulnerability detected, vulnerability assigned, and vulnerability resolved. Variant 502 shows the steps: vulnerability detected, vulnerability assigned to an unmonitored queue, and no commit merged. Variant 503 includes the steps of vulnerability creation and ticket creation failure. Each step includes the number of events occurrences. In the example shown in FIG. 5, it is easier to identify variants that may not achieve the desired outcome of the security process (e.g., resolving a vulnerability). For example, a total of 324 instances of vulnerabilities were discovered, yet only 289 were resolved. After being successfully discovered, those vulnerabilities remained unresolved because other steps in the process were not performed as expected.

At S409, the variants detected at S407 are associated with a security-process based on a predefined template. That is, a security-process is a collection of variants or at least one variant resulting from similar flows (flows with repeatable patterns). A security-process may be predefined, for example, by a user. Such a template may define a set of systems to collect events from, a name of the process, and a general description of the security-process. In yet an embodiment, templates of security-processes can be fed from external systems.

The association of variants to a security-process template may be based on the sources (security and non-security systems) feeding the events. For example, if a template defines a ticking system of a vendor A and a vulnerability scanner of a vendor B, variants resulting from flows of events from such systems will be correlated into the template.

In an embodiment, one of the variants associated with a security-process may be tagged as a target variant, which may define an ideal outcome of the security process, which may be referred to as the target or desired variant. Other tags of variants may include "risk" identifying variants that, if implemented, pose a high risk to an organization; "insufficient," a variant that does not meet a minimum standard of compliance with a security process, and so on. In an embodiment, a user may define an optimal variant or a flow.

Further, statistical data may be computed and associated with each variant. Such statistical data may include the number of occurrences of each variant, the number of occurrences of each event (mapped to a process step) in each variant, the mean time between events in the sequence, and so on.

In an embodiment, at S411, the method further includes causing a display of the variants of a security-process. Such a variant may be displayed as a graph indicating the start of the process and the end of the process. The user may select which variant(s) to display as the security process.

Figure 6:
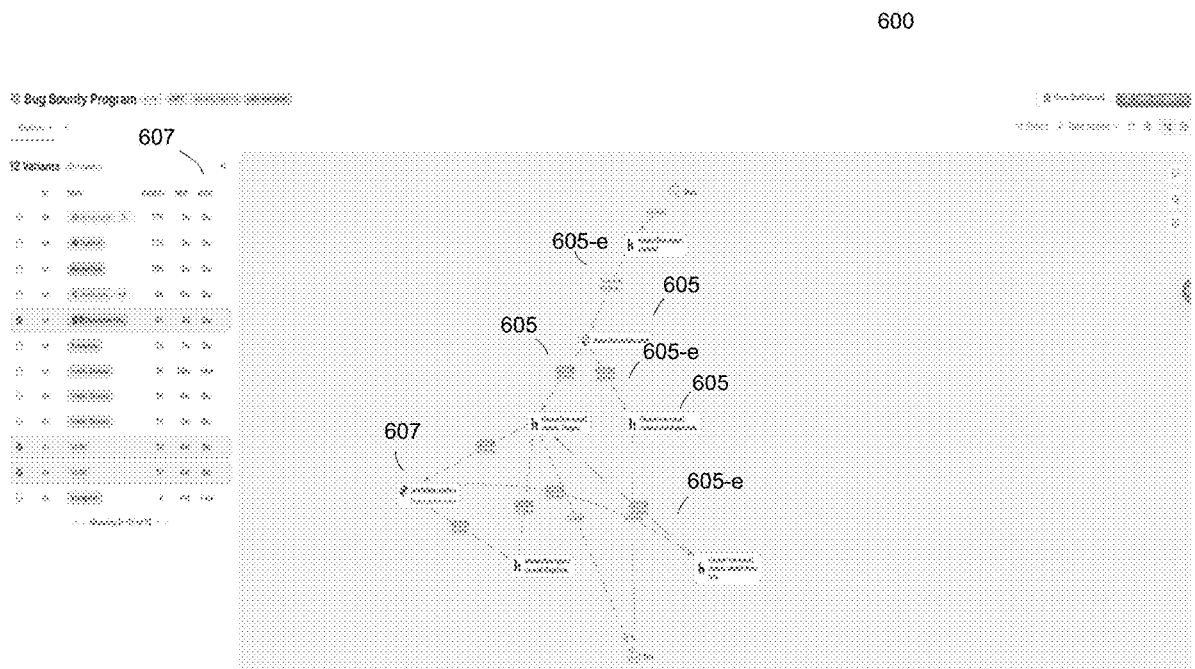
FIG. 6 is an example screenshot illustrating variants of a security-process according to the disclosed embodiments.

FIG. 6 shows an example screenshot 600 illustrating a number of variants (collectively labeled as 605) of a security process for reporting detection and closing security bugs. A variant is displayed as a graph, where the edges 605-*e* include information on the mean time between events and the occurrences of each event, and nodes 605-*n* of such a graph are the events. The selection area 607 allows the user to select which variant to display as part of the process. Therefore, providing the ability to compare between variants.

In an embodiment, the disclosed embodiments may allow sorting and filtering capabilities. For example, the filtering may be based on frequency, rate of occurrence of a step, and date of past process execution. In yet another embodiment, a new flow has appeared that corresponds to a specific predefined filter, such flow can be tagged as a corresponding variant. In an embodiment, an alert can be generated notifying a user that a new flow has appeared that belongs to a problematic variant.

Figure 7:
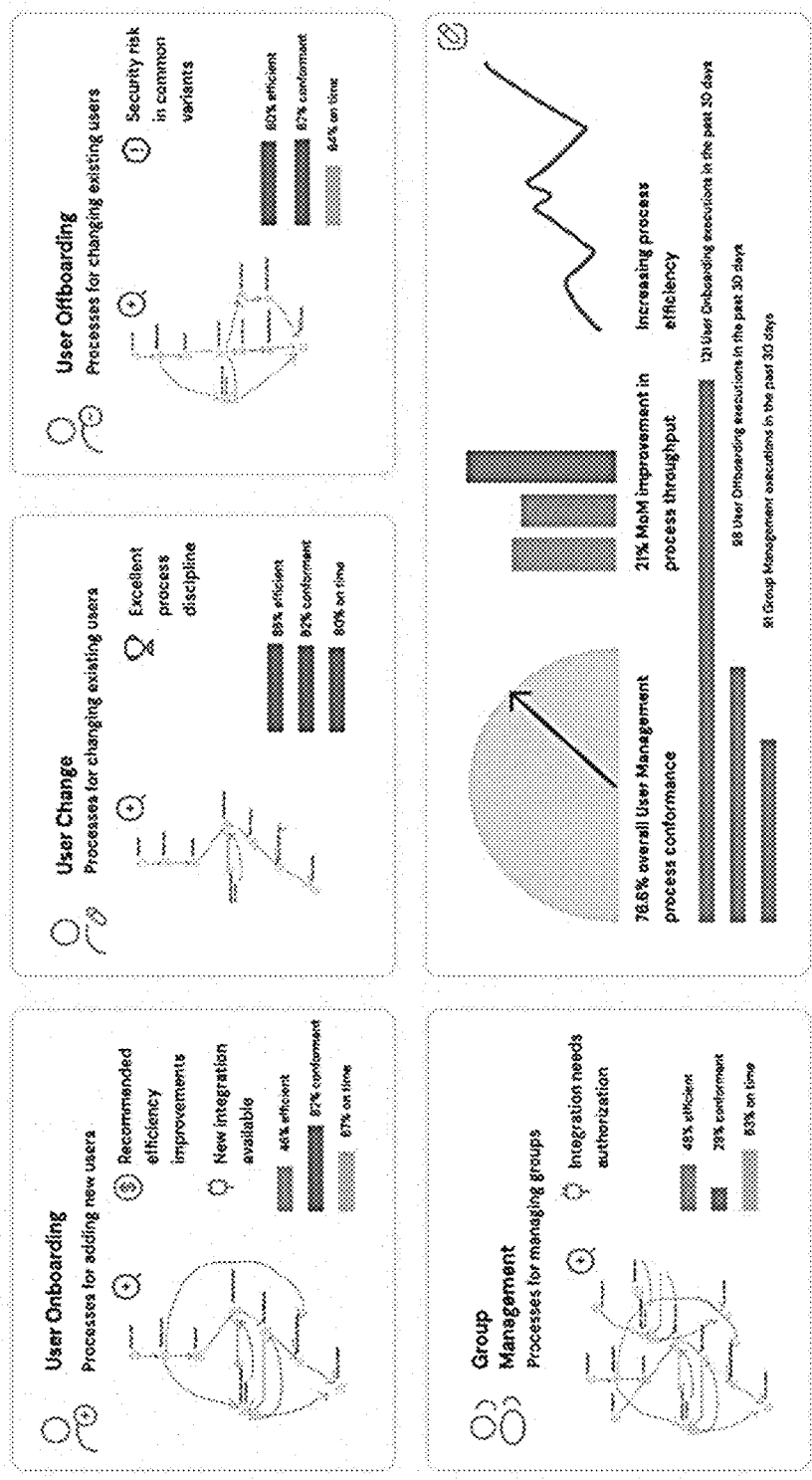
FIG. 7 is an example screenshot dashboard format according to the disclosed embodiments.

In an embodiment, insights can be generated based on the data collected for variants of a security process of each security process discovered by graphing system 115. The insights can be compared to a set of key performance indicators (KPIs). Examples of insights may include, for example, a mean time to resolve critical vulnerabilities, a mean time to contain incidents, and a mean time to fully offboard users. The insights (performances) of each discovered process can be displayed in a dashboard format, as demonstrated, for example, in FIG. 7.

KPIs are metrics that help measure the success of a process. For instance, in a privileged account management process, a KPI could be the completeness of privileged access removal. In an MFA enablement and recovery security-process, a KPI could be the proper vetting of MFA recovery requests. In a vulnerability detection and remediation security-process, a KPI may include the mean time to address critical CVEs. Finally, for an incident response process, a KPI may include anomaly detection and triage, where the KPI is the mean time elapsed between detection and analysis.

Figure 8:
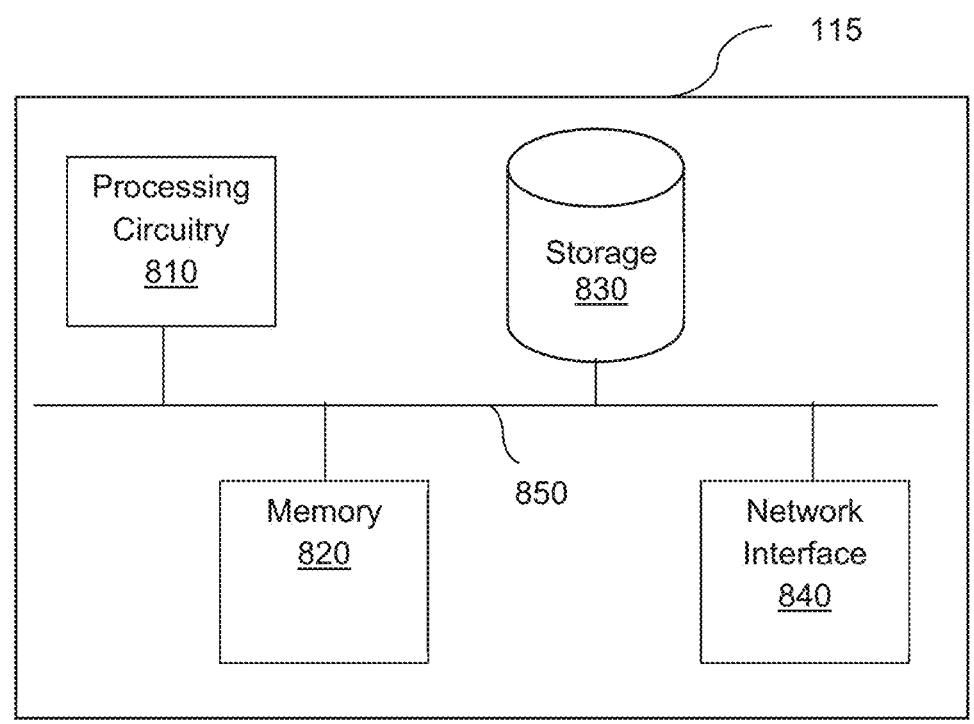
FIG. 8 is an example schematic diagram of a graphing system according to an embodiment.

FIG. 8 is an example schematic diagram of a graphing system 115 according to an embodiment. The graphing system 115 includes a processing circuitry 810 coupled to a memory 820, a storage 830, and a network interface 840. In an embodiment, the components of the graphing system 115 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read-only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows graphing system 115 to communicate with, for example, the various systems shown, for example, in FIG. 1.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cyber-security processes mining, comprising:
    correlating events received from a plurality of data sources into a plurality of flows, wherein a flow of the plurality of flows is a sequence of events having a same identifier, and wherein at least one of the plurality of data sources is a cyber-security system;
    correlating the plurality of flows into a plurality of variants, wherein a variant out of the plurality of variants includes one or more flows having the same repeatable pattern;
    correlating flows having a repeatable pattern into a variant, wherein a repeatable pattern includes a same number of events of the same type;
    associating the plurality of variants with at least one cyber-security process based on a predefined template defining the cyber-security process; and
    causing a display of the least one cyber-security process and its plurality of variants.

2. The method of claim 1, further comprising:
    tagging a variant of the plurality of variants with at least one of a cyber-security risk.

3. The method of claim 1, further comprising:
    analyzing variants associated with the least one cyber-security process to determine a target variant, wherein the target variant defines an optimal execution of the process.

4. The method of claim 1, wherein correlating the received events into the plurality of flows further comprises:
    correlating the received events received from the plurality of data sources into the plurality of flows based on a flow identifier (ID) which is similar to the same identifier of each event in the respective flow; and
    organizing the received event having the same flow ID in a sequence based on their respective timestamps.

5. The method of claim 1, wherein each variant of the plurality of variants is of flow having a different identifier.

6. The method of claim 1, wherein the data sources further include at least one non-cyber-security system.

7. The method of claim 6, wherein the at least one non-cyber-security system is any one of: a ticking system, a development pipeline platform, a standards system, and a workflow system.

8. The method of claim 6, wherein the at least one cyber-security system is any one of: an intrusion detection system (IDS), an intrusion prevention system (IPS), a data loss prevention (DLP) system, a network security tool, a vulnerability scanner, a cloud vulnerability scanner, a security information and event management (SIEM) system, and a web application firewall (WAF).

9. The method of claim 1, wherein the cyber-security process includes a sequence of steps related to a cyber-security issue.

10. The method of claim 1, further comprising:
    generating insights related to the plurality of variants of a cyber-security process; and
    comparing the generated insights to a set of key performance indicators (KPIs).

11. A non-transitory computer-readable medium storing a set of instructions for cyber-security processes mining, the set of instructions comprising:
    one or more instructions that, when executed by one or more processors of a device, cause the device to:
    correlate events received from a plurality of data sources into a plurality of flows, wherein a flow of the plurality of flows is a sequence of events having a same identifier, and wherein at least one of the plurality of data sources is a cyber-security system;
    correlate the plurality of flows into a plurality of variants, wherein a variant out of the plurality of variants includes one or more flows having the same repeatable pattern;
    correlate flows having a repeatable pattern into a variant, wherein a repeatable pattern includes a same number of events of the same type;
    associate the plurality of variants with at least one cyber-security process based on a predefined template defining the cyber-security process; and
    cause a display of the least one cyber-security process and its plurality of variants.

12. A system for cyber-security processes mining comprising:
    one or more processors configured to:
    correlate events received from a plurality of data sources into a plurality of flows, wherein a flow of the plurality of flows is a sequence of events having a same identifier, and wherein at least one of the plurality of data sources is a cyber-security system;
    correlate the plurality of flows into a plurality of variants, wherein a variant out of the plurality of variants includes one or more flows having the same repeatable pattern;
    correlate flows having a repeatable pattern into a variant, wherein a repeatable pattern includes a same number of events of the same type;
    associate the plurality of variants with at least one cyber-security process based on a predefined template defining the cyber-security process; and
    cause a display of the least one cyber-security process and its plurality of variants.

13. The system of claim 12, wherein the system is further configured to:
    tag a variant of the plurality of variants with at least one of a cyber-security risk.

14. The system of claim 12, wherein the system is further configured to:
    analyze variants associated with the least one cyber-security process to determine a target variant, wherein the target variant defines an optimal execution of the process.

15. The system of claim 12, wherein the system is further configured to:
    correlate the received events received from the plurality of data sources into the plurality of flows based on a flow identifier (ID) which is similar to the same identifier of each event in the respective flow; and
    organize the received event having the same flow ID in a sequence based on their respective timestamps.

16. The system of claim 12, wherein each variant of the plurality of variants is of flow having a different identifier.

17. The system of claim 12, wherein the data sources further include at least one non-cyber-security system.

18. The system of claim 17, wherein the at least one non-cyber-security system is any one of:
    a ticking system, a development pipeline platform, a standards system, and a workflow system.

19. The system of claim 17, wherein the at least one cyber-security system is any one of: an intrusion detection system (IDS), an intrusion prevention system (IPS), a data loss prevention (DLP) system, a network security tool, a vulnerability scanner, a cloud vulnerability scanner, a security information and event management (SIEM) system, and a web application firewall (WAF).

20. The system of claim 12, wherein the cyber-security process includes a sequence of steps related to a cyber-security issue.

\* \* \* \* \*